(12) United States Patent
Wilkinson (10) Patent No.: US 9,915,290 B2
(45) Date of Patent: Mar. 13, 2018

(54) TOOL ATTACHMENT FOR POWER-DRIVEN WINDING OF WINCH STRAPS

(71) Applicant: Steven Reese Wilkinson, Pliny, WV (US)

(72) Inventor: Steven Reese Wilkinson, Pliny, WV (US)

( * ) Notice: Subject to any disclaimer, the term of this patent is extended or adjusted under 35 U.S.C. 154(b) by 476 days.

(21) Appl. No.: 14/671,117

(22) Filed: Mar. 27, 2015

(65) Prior Publication Data
US 2015/0274061 A1 Oct. 1, 2015

Related U.S. Application Data

(60) Provisional application No. 61/971,581, filed on Mar. 28, 2014.

(51) Int. Cl.
| | | |
|---|---|---|
| *B25F 3/00* | (2006.01) | |
| *F16D 1/06* | (2006.01) | |
| *B60P 7/08* | (2006.01) | |
| *F16D 1/10* | (2006.01) | |
| *F16D 1/112* | (2006.01) | |

(52) U.S. Cl.
CPC .............. *F16D 1/06* (2013.01); *B60P 7/0846* (2013.01); *F16D 1/10* (2013.01); *F16D 1/112* (2013.01); *F16D 2001/062* (2013.01); *F16D 2001/102* (2013.01); *Y10T 24/2175* (2015.01); *Y10T 403/51* (2015.01)

(58) Field of Classification Search
CPC ........ B65H 75/305; B25F 3/00; B60P 7/0846; B60P 7/0853
See application file for complete search history.

(56) References Cited

U.S. PATENT DOCUMENTS

| | | | | |
|---|---|---|---|---|
| 6,139,233 A | * | 10/2000 | Wilsey | B60P 7/083 410/100 |
| 6,467,755 B2 | * | 10/2002 | Reilly | B60P 7/0846 254/223 |
| 6,729,604 B1 | * | 5/2004 | Claycomb | B60P 7/0846 24/68 R |
| 6,824,339 B1 | * | 11/2004 | Childers | B60P 7/0846 16/110.1 |
| 7,278,808 B1 | * | 10/2007 | Sisk, Sr. | B60P 7/0853 279/144 |
| 7,410,336 B2 | * | 8/2008 | Parks | B60P 7/0846 279/144 |
| 9,156,652 B1 | * | 10/2015 | Warboys | B65H 79/00 |
| 2011/0079967 A1 | * | 4/2011 | Presley | B25F 3/00 279/145 |

* cited by examiner

*Primary Examiner* — Michael P Ferguson (57) ABSTRACT

An apparatus used for winding or unwinding winch straps includes a clevis, a first engagement plate, and a second engagement plate. Both the first engagement plate and the second engagement plate contain a lobe, a lug, an oblong body, and a plate pinhole which are rotatably connected to the clevis with a plate retaining pin which traverses through the plate pinhole. When in use, a power tool is attached to a tool-receiving slot, which is integrated into a structural body of the clevis. Next, the lobe of the first engagement plate and the second engagement plate establishes a connection with the spool hub the apparatus is being used on. Simultaneously, the lug of the first engagement plate and the second engagement plate are pressed against the spool hub. Therefore, the force is transferred from the power tool to the spool via the introduced apparatus.

17 Claims, 14 Drawing Sheets

TOOL ATTACHMENT FOR POWER-DRIVEN WINDING OF WINCH STRAPS

The current application claims a priority to the U.S. Provisional Patent application Ser. No. 61/971,581 filed on Mar. 28, 2014.

FIELD OF THE INVENTION

The present invention relates generally to the field of coiling and winding. More specifically, the present invention relates to an apparatus that winds winch straps that are used to secure loads on a cargo trailer.

BACKGROUND OF THE INVENTION

In fields involving heavy loads, winding winch straps are an absolute necessity. However, as experienced by individuals in this field, rolling winch straps requires considerable effort. Most operators roll the straps manually which is repetitive and time consuming. The manual rolling of the straps can be both disadvantageous and dangerous. For instance, the manual winding of winch straps onto a winch may result in hand or finger lacerations from sharp edges on the winch hub. Furthermore, manual winding can also result in repetitive motion injuries such as Carpal Tunnel Syndrome. The time consuming nature of manually winding straps can result in loss of productivity and associated cost penalties that are disadvantageous in the industry. Even though previous devices address the issues at hand to some extent, these devices do not provide a practical solution. For instance, a tapered rubber plug which is attached to a drill needs constant force for the winding strap to roll continuously. Since the tapered rubber plugs deteriorate with time, the force that needs to be applied increases considerably. Ultimately, the rubber plug needs to be replaced. Another significant fault seen in most previous devices is that these devices have minimum connection with the receiving hub. When using a power tool such as a power drill or impact wrench, the minimal connection with the receiving hub poses noticeable risk to the operator, especially with a slippery surface.

A majority of the powered strap winding tools available in the market are limited to be used with drills. Since the existing strap winding tools have a shaft that extends from the device to fit a drill, these strap winding tools cannot be used with an impact wrench. This can be disadvantageous to certain users such as truck drivers who commonly carry and use impact wrenches.

Many winch strap users prefer to store away the winch straps when not in use. Removing the winch straps from the spool for separate storage away from exposure to the sun can extend the longevity of the winch strap. However, most of the available winding apparatus on the market that allow removal of the winch strap are manually operated. Manual operation of the apparatus involves the use of both hands while also exposing the operator to dirt and mud which is on the winch strap. In order to address the issue, the present invention also introduces a redesigned spool that can be driven by a powered strap winding tool and which allows users to conveniently remove the winch strap in a rolled configuration for separate "off-winch" storage.

The objective of the present invention is to provide a successful solution to the aforementioned issues. The present invention introduces an apparatus that can receive different power tools in addition to manually driven tools. As a result, the present invention can be conveniently controlled with a power drill, an impact wrench, a socket "speed handle", or any other comparable device. Moreover, the present invention establishes a firm connection with the receiving hub of the spool or reel. Therefore, user safety is enhanced when utilizing the present invention.

DETAIL DESCRIPTIONS OF THE INVENTION

All illustrations of the drawings are for the purpose of describing selected versions of the present invention and are not intended to limit the scope of the present invention.

The present invention introduces an apparatus for winding winch straps primarily using power tools, but which also can accept a variety of manual drivers such as socket speed handles. The power tools that can be utilized along with the present invention include, but are not limited to, an impact wrench or a power drill. The secure design of the present invention establishes a firm connection with a cranking head of a winch strap spool hub. Therefore, the force applied by the power tool is effectively transferred to the winch strap spool hub, allowing the user to conveniently control the winding of the winch strap.

Figure 1:
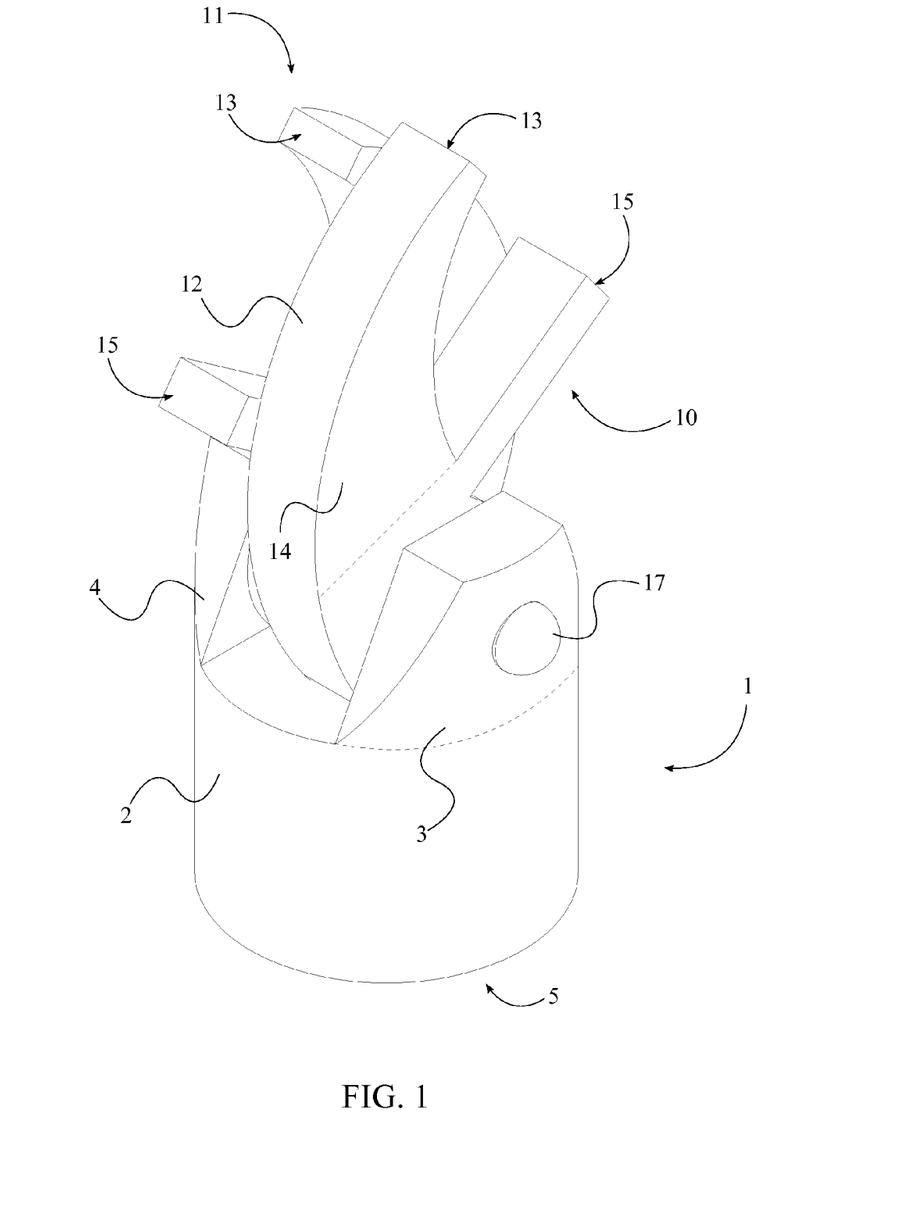
FIG. 1 is a perspective view of the present invention.
Figure 2:
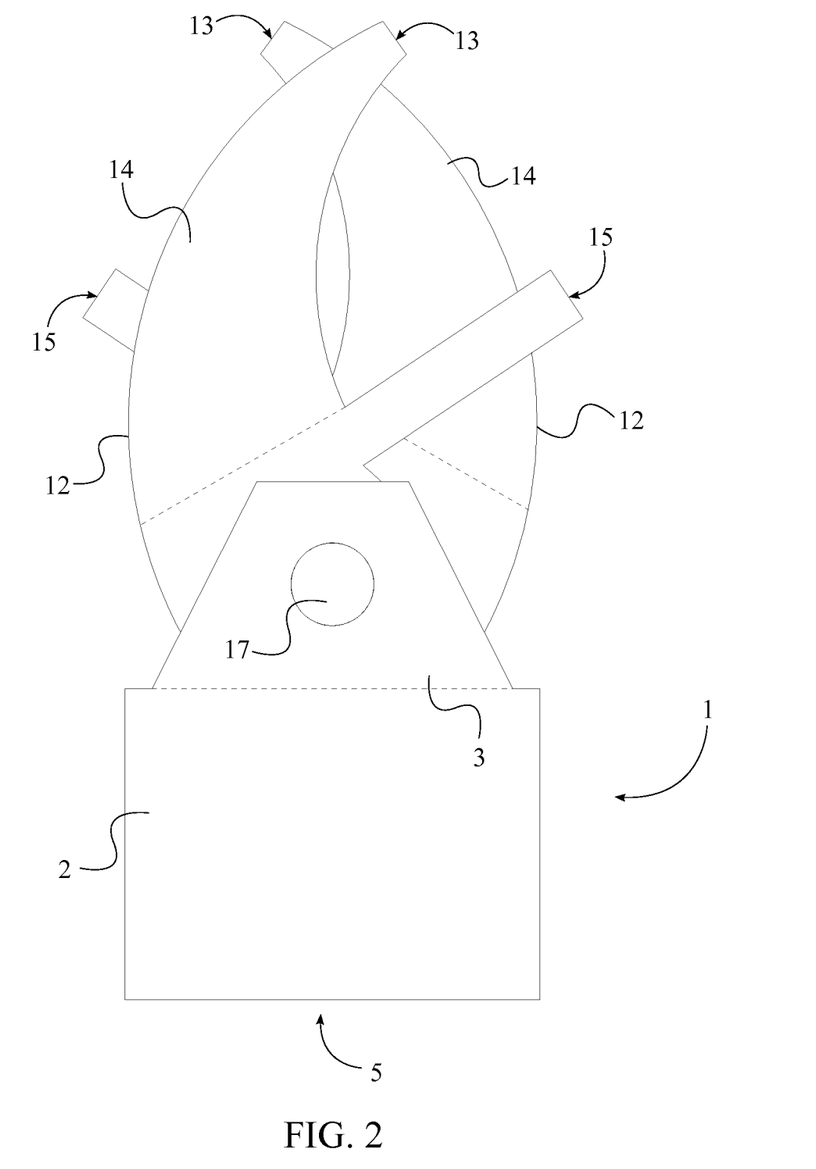
FIG. 2 is a side view of the present invention, wherein a first engagement plate and a second engagement plate are in an unlocked configuration.
Figure 3:
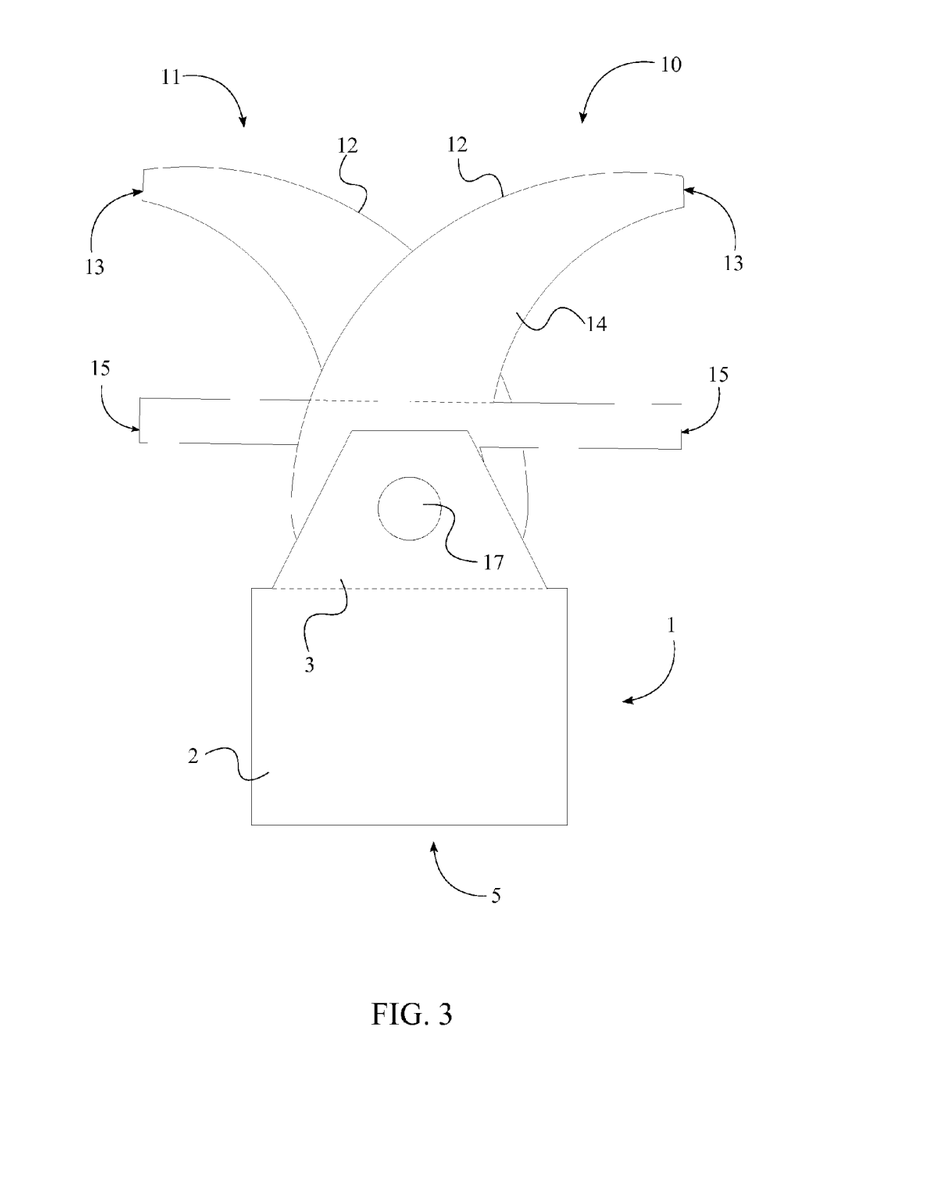
FIG. 3 is a side view of the present invention, wherein the first engagement plate and the second engagement plate are in a locked configuration.

As illustrated in FIGS. 1-3, the present invention comprises a clevis 1, a first engagement plate 10, and a second engagement plate 11. The clevis 1 holds the first engagement plate 10 and the second engagement plate 11, which are utilized to establish a connection with a spool hub. The clevis 1 comprises a structural body 2, a first protrusion 3, a second protrusion 4, and a tool-receiving slot 5. In the preferred embodiment of the present invention, the structural body 2 is cylindrical in shape. However, the structural body 2 can have a different shape in another embodiment of the present invention. The power tool, which can be, but is not limited to, a power drill or an impact wrench, is attached to the tool-receiving slot 5. The tool-receiving slot 5 is integrated into the structural body 2, opposite the first protrusion 3 and the second protrusion 4 which are extended from the structural body 2. The first protrusion 3 is utilized to support the first engagement plate 10. Likewise, the second protrusion 4 is utilized to support the second engagement plate 11. As a result of the positioning of the tool-receiving slot 5, the power tool is also attached opposite the first engagement plate 10 and the second engagement plate 11. Thus, the user controls the rotational motion of the spool hub with the power tool attached at the tool-receiving slot 5.

As seen in FIGS. 1-6, the first engagement plate 10 and the second engagement plate 11 each comprise an oblong body 12, a lobe 13, a lug 15, and a plate pinhole 16. The lobe 13 and the lug 15 extend from the oblong body 12 allowing the first engagement plate 10 and the second engagement plate 11 to conveniently connect to the spool hub the present invention is used on. Moreover, the lobe 13 and the lug 15 are positioned offset from each other along the oblong body 12. The lobe 13 and the plate pinhole 16 are positioned opposite to each other along the oblong body 12 such that the position of the lobe 13 can be varied by rotating the first engagement plate 10 or the second engagement plate 11 about the plate pinhole 16 as the present invention is attached to a winch strap winding spool hub. Once attached to the spool hub, the lobe 13 of the first engagement plate 10 and the lobe 13 of the second engagement plate 11 cling to the spool hub. When the lobe 13 is attached to the spool hub, the lug 15 presses against the spool hub such that the present invention remains stationary when in use. In order to do so, the lug 15 is positioned in between the lobe 13 and the plate pinhole 16. The plate pinhole 16 is utilized when attaching the first engagement plate 10 and the second engagement plate 11 to the clevis 1. More specifically, the first engagement plate 10 and the second engagement plate 11 are rotatably connected to the clevis 1 by utilizing the plate pinhole 16 of the first engagement plate 10 and the plate pinhole 16 of the second engagement plate 11 respectively.

As further illustrated in FIGS. 1-6, the first engagement plate 10 is positioned parallel and adjacent to the second engagement plate 11. Furthermore, the lobe 13 and the lug 15 of the first engagement plate 10 are oriented opposite the lobe 13 and the lug 15 of the second engagement plate 11. The positioning and orientation of the first engagement plate 10 and the second engagement plate 11 allows the present invention to be attached to the spool hub at two attachment points which are positioned opposite to each other on the spool hub.

The first engagement plate 10 and the second engagement plate 11 are positioned in between the first protrusion 3 and the second protrusion 4 to minimize any movement in relation to the clevis 1. In order to contain the first engagement plate 10 and the second engagement plate 11, the first protrusion 3 and the second protrusion 4 are positioned offset and parallel to each other. A plate retaining pin 17 is utilized to connect the first engagement plate 10 and the second engagement plate 11 to the clevis 1. The plate pinhole 16 traverses through the oblong body 12 allowing the first engagement plate 10 and the second engagement plate 11 to receive the plate retaining pin 17. The clevis 1 further comprises a first pin-receiving hole 8 and a second pin-receiving hole 9 which perpendicularly traverse through the first protrusion 3 and the second protrusion 4 respectively. Therefore, when the first engagement plate 10 and the second engagement plate 11 are attached to the clevis 1, the plate retaining pin 17 traverses through the first pin-receiving hole 8, the plate pinhole 16 of the first engagement plate 10, the plate pinhole 16 of the second engagement plate 11, and the second pin-receiving hole 9. Resultantly, the first engagement plate 10, the second engagement plate 11, and the clevis 1 are secured together.

As seen in FIGS. 1-3, when the first engagement plate 10 and the second engagement plate 11 are positioned in between the first protrusion 3 and the second protrusion 4, the first engagement plate 10 is positioned adjacent to the first protrusion 3. Since the plate retaining pin 17 traverses through the first pin-receiving hole 8 and the plate pinhole 16 of the first engagement plate 10, the first pin-receiving hole 8 is concentric with the plate pinhole 16 of the first engagement plate 10. Likewise, the second engagement plate 11 is positioned adjacent the second protrusion 4. Similar to the first engagement plate 10, the plate pinhole 16 of the second engagement plate 11 is concentric with the second pin-receiving hole 9 allowing the plate-retaining pin 17 to traverse through the second pin-receiving hole 9 as well. Due to the positioning of the first engagement plate 10 and the second engagement plate 11, the plate pinhole 16 of the first engagement plate 10 is also concentric with the plate pinhole 16 of the second engagement plate 11.

Figure 4A:
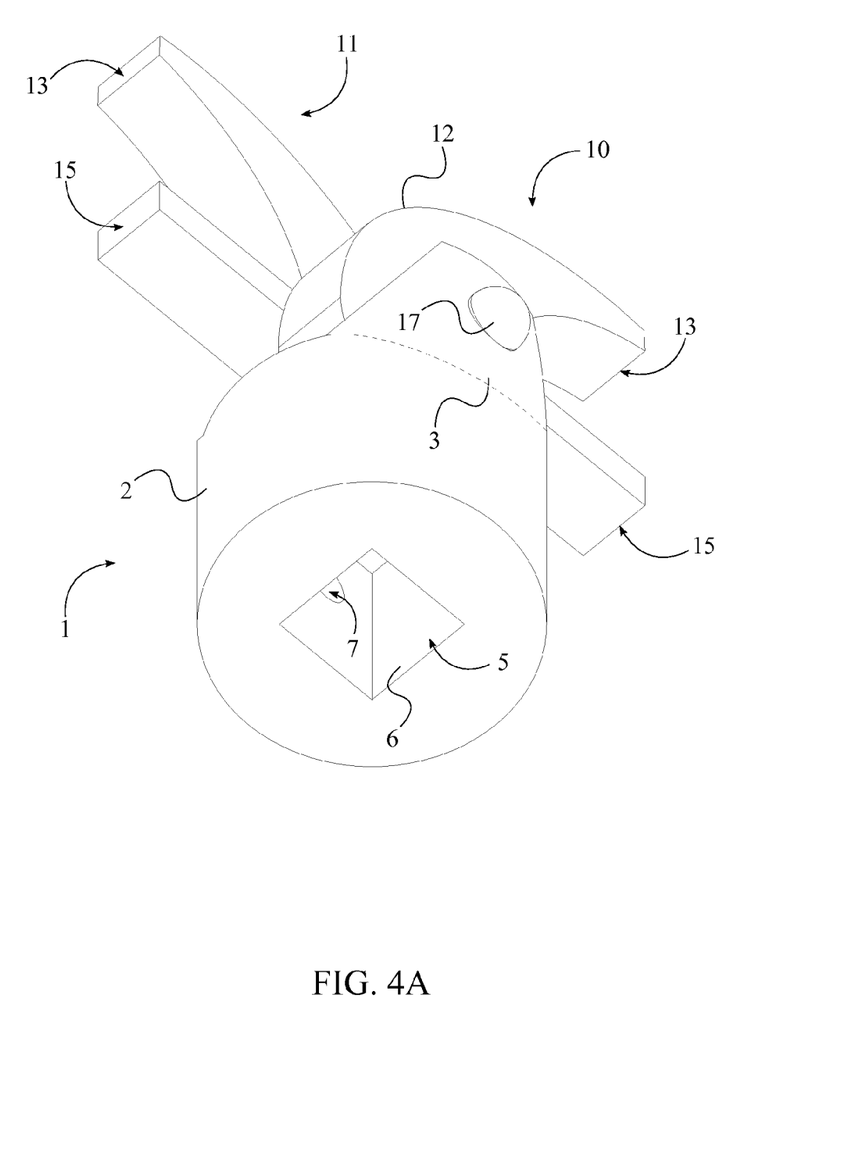
FIG. 4A is a bottom perspective view of the present invention.
Figure 4B:
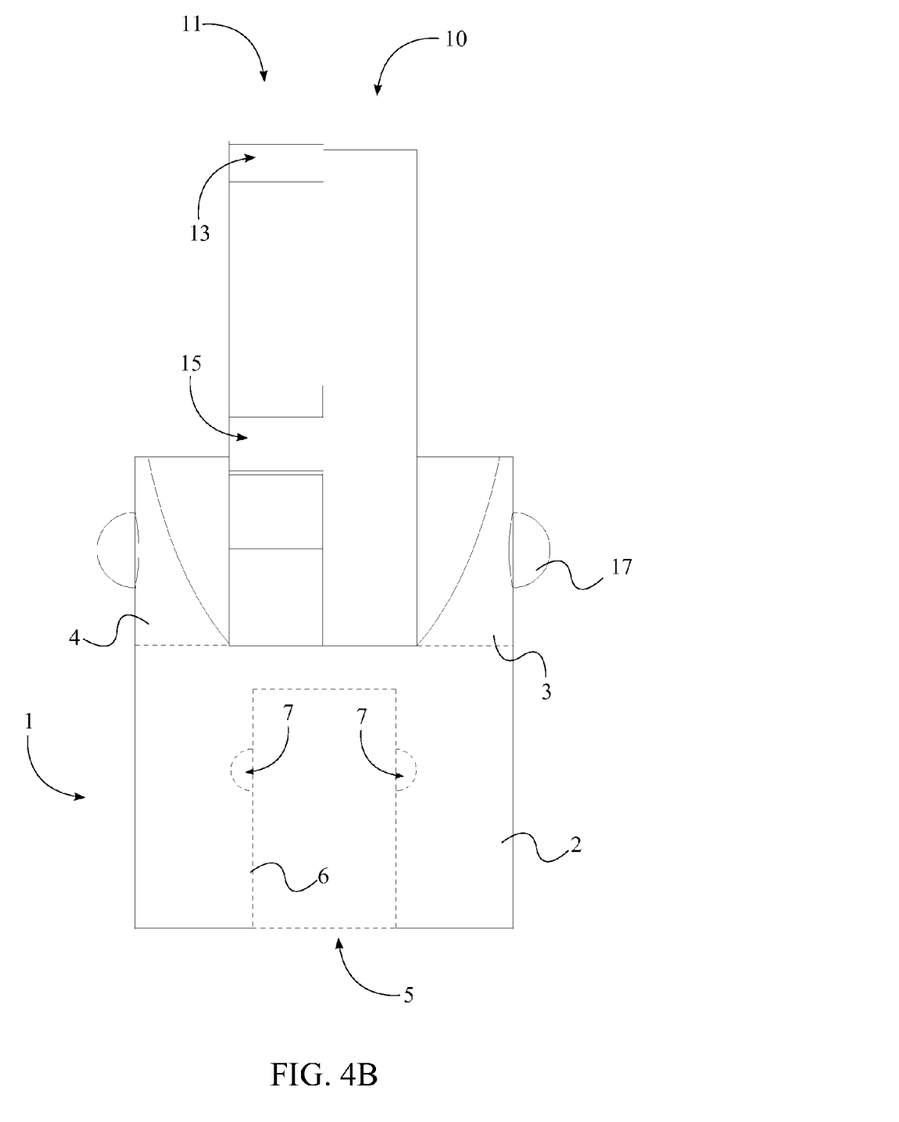
FIG. 4B is a front view of the present invention.
Figure 5:
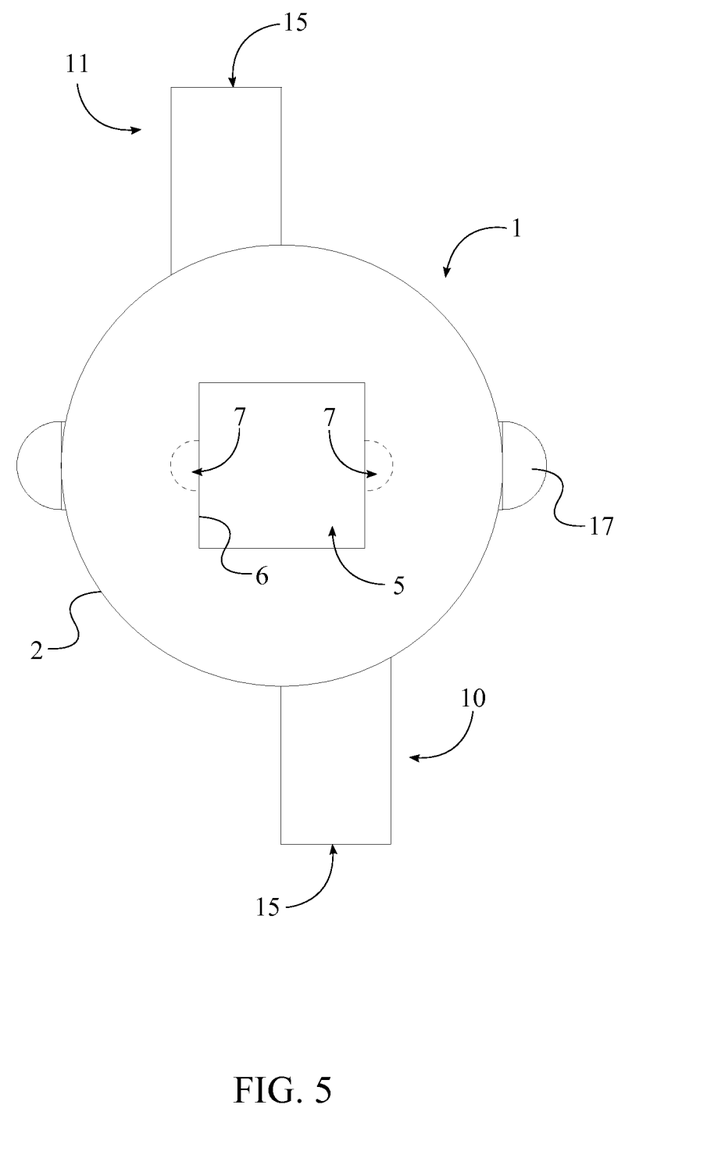
FIG. 5 is a bottom view of the present invention.
Figure 6:
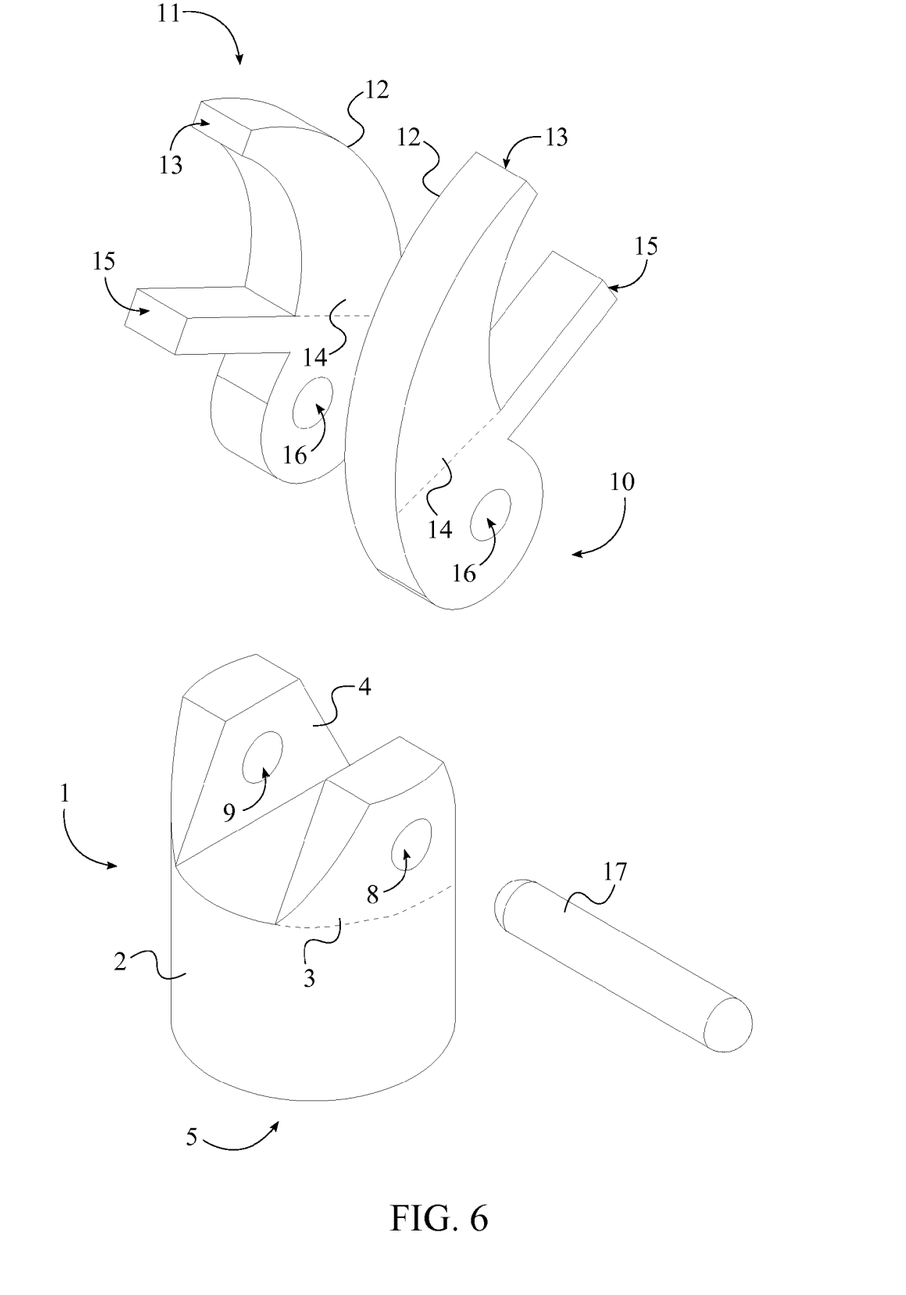
FIG. 6 is an exploded perspective view of the present invention.
Figure 12:
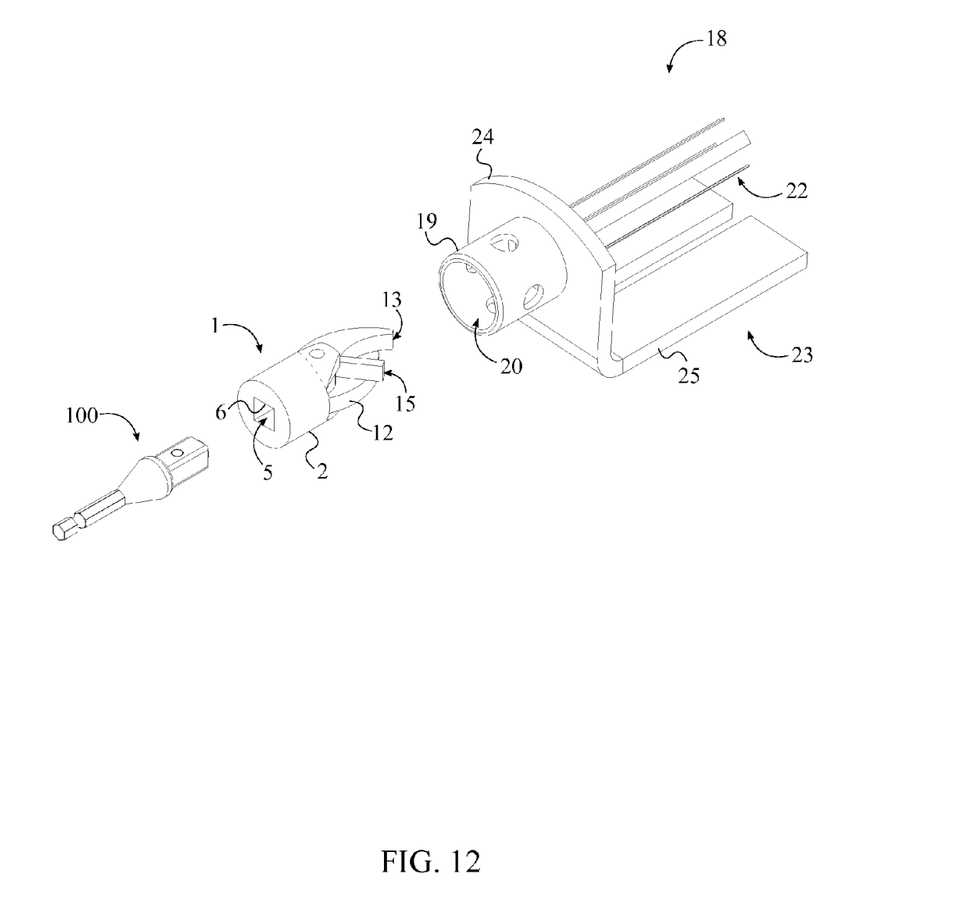
FIG. 12 is a perspective exploded view illustrating the present invention being used with a drill adapter and the winding assembly.
Figure 13:
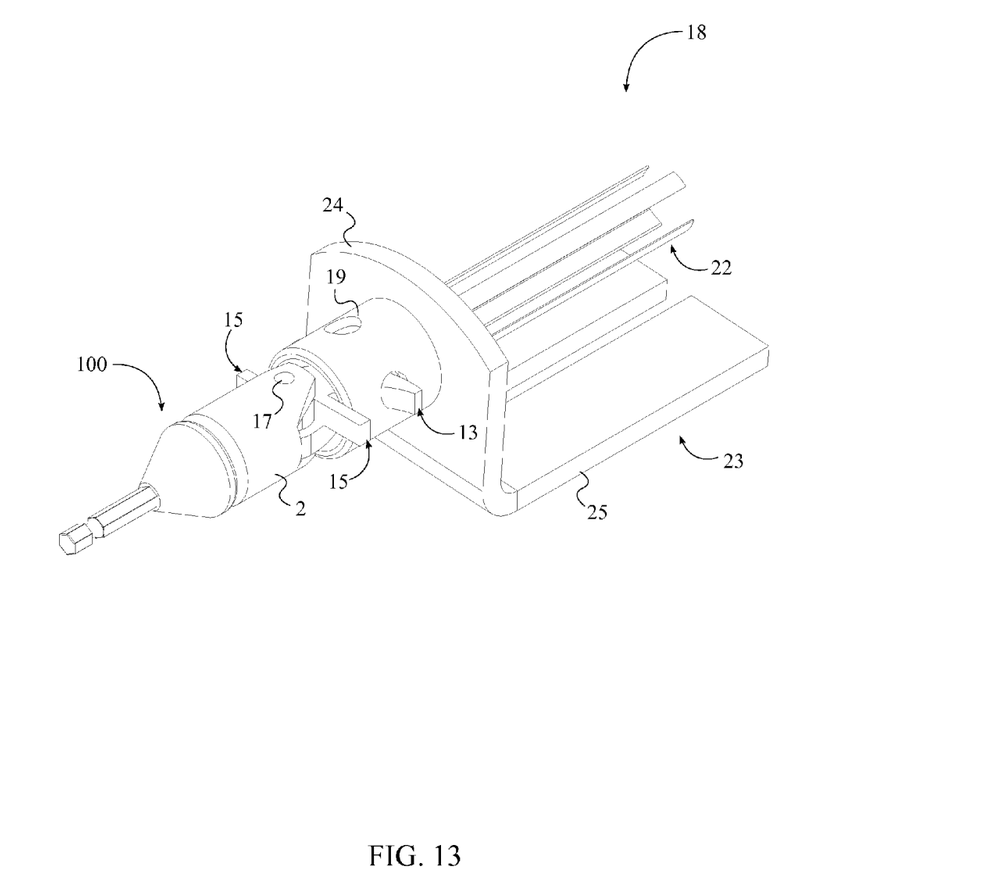
FIG. 13 is a perspective view illustrating the present invention being utilized with the drill adapter and the winding spool.

As discussed earlier, the power tool utilized in winding the winch strap is attached to the tool-receiving slot 5. As illustrated in FIG. 4A, FIG. 4B and FIG. 5, the tool-receiving slot 5 comprises an inner lateral surface 6 and an at least one receiving slot 7. When the power tool, which can be, but is not limited to a power drill or an impact wrench, is attached to the tool-receiving slot 5, the power tool is secured against the inner lateral surface 6. The at least one receiving slot 7 is utilized to secure the square drive of the impact wrench or a drill adapter 100 attached to a power drill. In order to secure the power tool, the at least one receiving slot 7 perpendicularly traverses into the inner lateral surface 6. The at least one receiving slot 7 receives a securing pin or securing ball of an impact wrench or a socket adapter. In particular, the at least one receiving slot 7 allows the present invention to utilize the securing ball feature of both a drill adaptor and an impact wrench. If four receiving slots are utilized in another embodiment of the present invention, each of the four receiving slots are 90-degrees apart from each other and traverses into a corresponding surface of the inner lateral surface 6. FIG. 12 and FIG. 13 illustrate the drill adapter 100 being attached to the present invention via the tool-receiving slot 5. The securing ball connection between the power tool and the present invention helps prevent inadvertent disengagement of the present invention from the impact wrench or a drill adapter output shaft.

Figure 7:
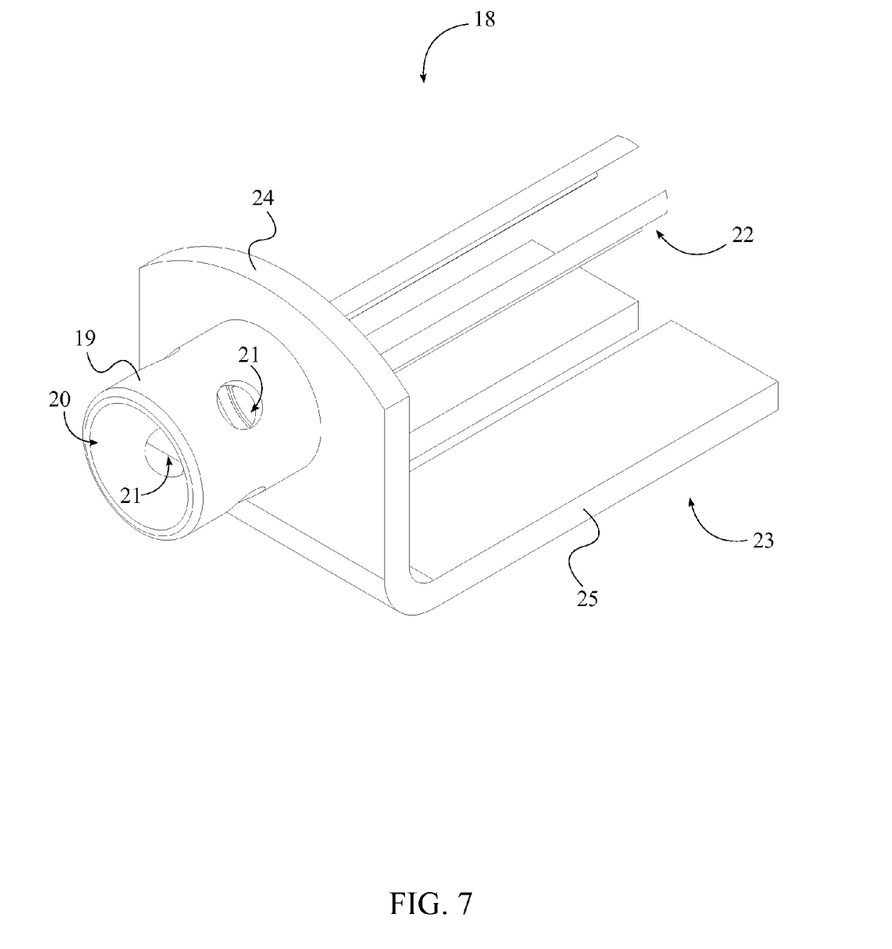
FIG. 7 is a perspective view of a winding assembly of the present invention.
Figure 8:
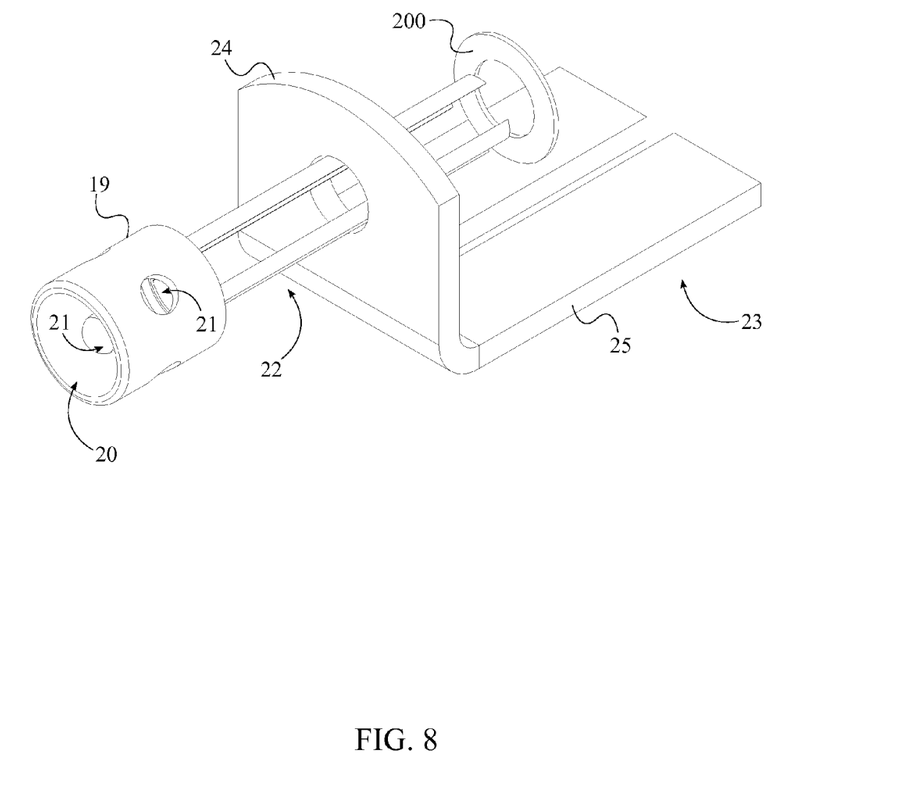
FIG. 8 is an exploded perspective view of the winding assembly.
Figure 9:
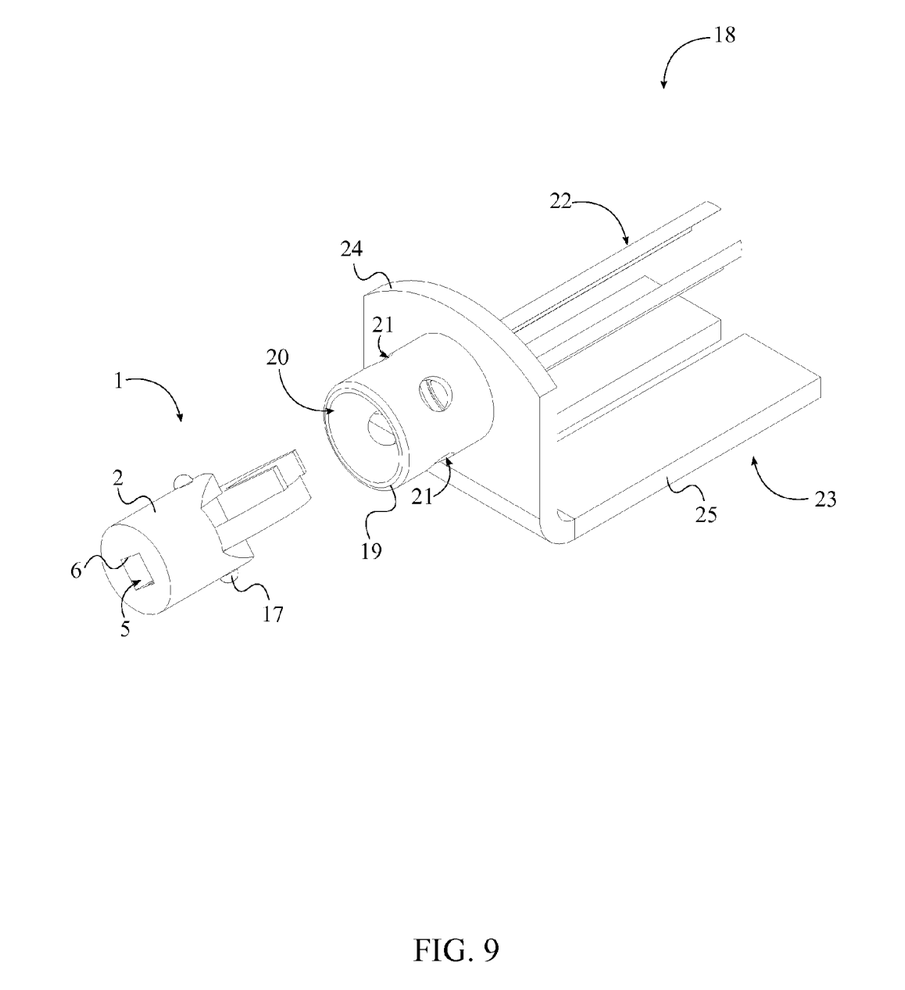
FIG. 9 is an exploded view of the present invention and the winding assembly.
Figure 10:
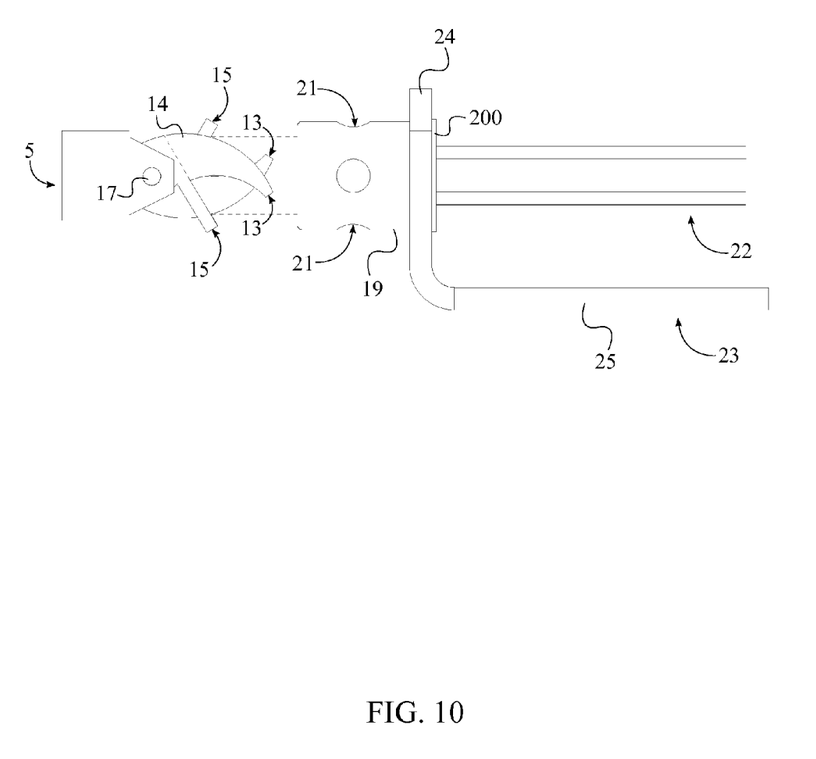
FIG. 10 is an exploded side view of the present invention and the winding assembly.

As illustrated in FIGS. 7-9, the present invention further comprises a detachable winding assembly 18. By utilizing the detachable winding assembly 18 introduced with the present invention, the user can remove the winch strap from the detachable winding assembly 18 when necessary. The ability to remove the winch strap for separate storage is especially beneficial for the longevity of the winch strap. The detachable winding assembly 18 comprises a cranking head 19, a spool 22, a spool retaining washer 200, and an L-shaped base 23. The cranking head 19 provides a connection point to the present invention. In order to receive a lobe section 14 of the first engagement plate 10 and a lobe section 14 of the second engagement plate 11, the cranking head 19 comprises a cavity 20 and an at least one pair of lobe-receiving holes 21. The cavity 20 traverses into the cranking head 19 to receive the lobe section 14. The lobe section 14 of the first engagement plate 10 and the second engagement plate 11 are inserted into the cavity 20 such that the lobe 13 of the first engagement plate 10 and the second engagement plate 11 are positioned within the pair of lobe-receiving holes 21. In order to receive the lobe 13 of the first engagement plate 10 and the lobe 13 of the second engagement plate 11, the pair of lobe-receiving holes 21 laterally traverses into the cranking head 19. Moreover, the cavity 20 is positioned perpendicular to the pair of lobe-receiving holes 21 such that the cavity 20 receives the lobe section 14, and the pair of lobe-receiving holes 21 receives the lobe 13 of the first engagement plate 10 and the second engagement plate 11 simultaneously. As discussed earlier, the lobe 13 and the lug 15 of the first engagement plate 10 are oriented opposite the lobe 13 and the lug 15 of the second engagement plate 11. In order to correspond to the lobe 13 of the first engagement plate 10 and the lobe 13 of the second engagement plate 11, the pair of lobe-receiving holes 21 is diametrically opposed to each other along the cranking head 19. Similar to the pair of lobe-receiving holes 21, multiple pairs of lobe-receiving holes can be radially positioned along the cranking head 19. As an example, if two pairs of lobe-receiving holes are utilized, wherein four lobe-receiving holes laterally traverse into the cranking head 21, each lobe-receiving hole is 90-degrees apart from each other. When the lobe 13 of the first engagement plate 10 and the lobe 13 of the second engagement plate 11 are positioned within the pair of lobe-receiving holes 21, the lug 15 of the first engagement plate 10 and the lug 15 of the second engagement plate 11 are pressed against the cranking head 19 as seen in FIG. 10.

The L-shaped base 23 stabilizes the detachable winding assembly 18 on a truck bed or similar mounting surface the detachable winding assembly 18 is intended to be used on. As illustrated in FIG. 8, the L-shaped base 23 comprises a first leg 24 and a second leg 25. The cranking head 19 is axially connected to the spool 22 through the first leg 24. The second leg 25 is secured against the truck bed or similar surface the detachable winding assembly 18 is used on. The spool 22 in which the winch strap is rolled around is rotatably mounted to the first leg 24, adjacent to the second leg 25. As illustrated in FIG. 8, the spool 22 is rotatably mounted with the spool retaining washer 200 in the preferred embodiment of the present invention. In order to do so, the spool 22 traverses through the spool retaining washer 200 which is positioned adjacent the first leg 24 and opposite the cranking head 19. As a result, the rotational motion from the power tool is effectively transferred onto the spool 22. However, in another embodiment of the present invention, a different mounting method can be utilized.

When utilizing the present invention the following procedure is followed. Initially, the power tool is attached to the present invention at the tool-receiving slot 5. If a power drill is utilized, the power drill is connected to the tool-receiving slot 5 via the drill adapter 100 as shown in FIG. 12 and FIG. 13. On the other hand, if an impact wrench is connected, the square drive of the impact wrench is positioned against the inner lateral surface 6. In both instances, the square drive of the impact wrench locks in with the at least one receiving slot 7. Upon establishing a connection between the power tool and the present invention, the user connects the present invention to the cranking head of 19 of the detachable winding assembly 18 or the spool hub.

Figure 11:
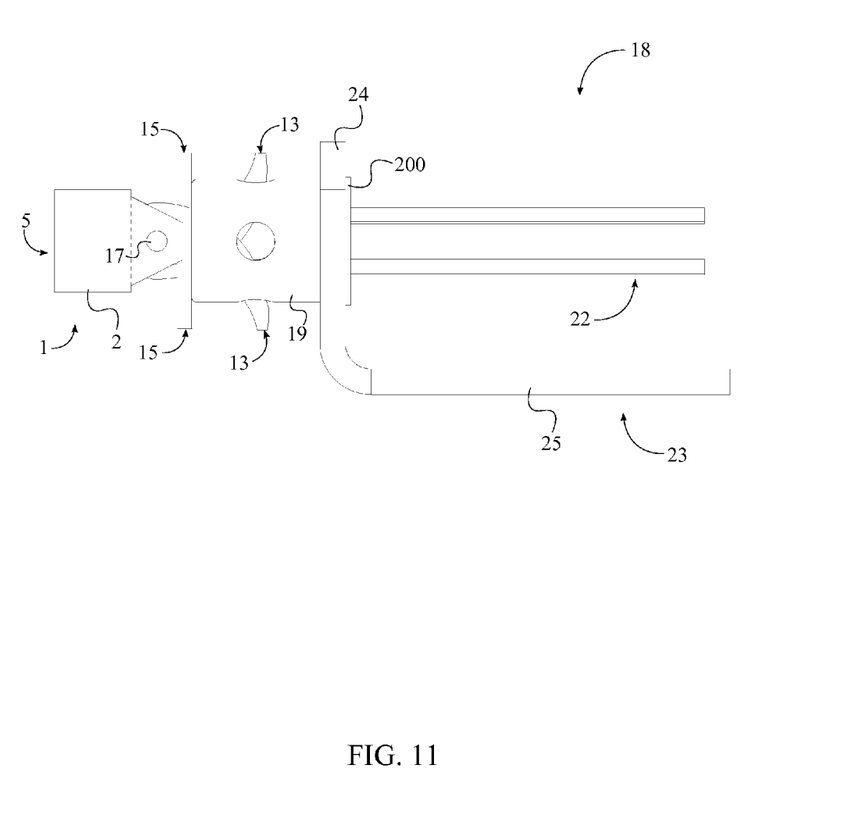
FIG. 11 is a side view of the present invention being connected to the winding assembly.

An identical procedure is followed when connecting the present invention to the detachable winding assembly 18 and also when connecting the present invention to a regular winch strap spool hub. FIG. 10 illustrates the present invention prior to being attached to the detachable winding assembly 18. On the other hand, FIG. 11 illustrates the present invention being attached to the detachable winding assembly 18. As an initial step, the lobe section 14 of the first engagement plate 10 and the lobe section 14 of the second engagement plate 11 are inserted into the cavity 20. When inserting the lobe section 14, the present invention is in an unlocked configuration as illustrated in FIG. 2. Next, the lobe 13 of the first engagement plate 10 and the lobe 13 of the second engagement plate 11 are positioned within the pair of lobe-receiving holes 21 such that the present invention is in the locked configuration as shown in FIG. 3. Resultantly, the lug 15 of the first engagement plate 10 and the lug 15 of the second engagement plate 11 are pressed against the cranking head 19 as shown in FIG. 11. The cranking head 19 is axially connected to the spool 22 in which the winch strap is rolled in. Therefore, the user can conveniently control the rotational motion of the spool 22 through the rotational motion of the cranking head 19.

Although the invention has been explained in relation to its preferred embodiment, it is to be understood that many other possible modifications and variations can be made without departing from the spirit and scope of the invention as hereinafter claimed.

What is claimed is:

1. An apparatus for attaching power tools used in winding winch straps comprising:
   a clevis;
   a first engagement plate;
   a second engagement plate;
   the clevis comprising a structural body, a first protrusion, a second protrusion, and a tool-receiving slot;
   the first engagement plate and the second engagement plate each comprising an oblong body, a lobe, a lug, and a plate pinhole;
   the first engagement plate being positioned parallel and adjacent the second engagement plate;
   the lobe and the plate pinhole being positioned opposite to each other along the oblong body;
   the lug being positioned in between the lobe and the plate pinhole;
   the lobe and the lug of the first engagement plate being oriented opposite the lobe and the lug of the second engagement plate;
   the first engagement plate and the second engagement plate being positioned in between the first protrusion and the second protrusion;
   the first engagement plate and the second engagement plate being rotatably connected to the clevis;
   the tool-receiving slot being integrated into the structural body, opposite the first protrusion and the second protrusion;
   the clevis further comprising a first pin-receiving hole and a second pin-receiving hole;
   the first protrusion and the second protrusion being positioned offset and parallel to each other;
   the first protrusion and the second protrusion being extended from the structural body;
   the first pin-receiving hole perpendicularly traversing through the first protrusion;
   the second pin-receiving hole perpendicularly traversing through the second protrusion;
   a single plate retaining pin;
   the first engagement plate being positioned adjacent the first protrusion;
   the first pin-receiving hole being concentric with the plate pinhole of the first engagement plate;
   the plate pinhole of the first engagement plate being concentric with the plate pinhole of the second engagement plate;

the second engagement plate being positioned adjacent the second protrusion;
the plate pinhole of the second engagement plate being concentric with the second pin-receiving hole; and
the single plate retaining pin traversing through the first pin-receiving hole, the plate pinhole of the first engagement plate, the plate pinhole of the second engagement plate, and the second pin-receiving hole.

2. The apparatus for attaching power tools used in winding winch straps as claimed in claim 1 comprising:
the plate pinhole traversing through the oblong body;
the lobe and the lug extending from the oblong body; and
the lobe and the lug being positioned offset from each other along the oblong body.

3. The apparatus for attaching power tools used in winding winch straps as claimed in claim 1 comprising:
the tool-receiving slot comprising an inner lateral surface and an at least one receiving slot; and
the at least one receiving slot perpendicularly traversing into the inner lateral surface.

4. The apparatus for attaching power tools used in winding winch straps as claimed in claim 1 comprising:
a cranking head;
a spool;
an L-shaped base;
the cranking head comprising a cavity and at least one pair of lobe-receiving holes;
the L-shaped base comprising a first leg and a second leg;
the pair of lobe-receiving holes laterally traversing into the cranking head;
the cavity traversing into the cranking head;
the cavity being positioned perpendicular to the pair of lobe-receiving holes;
the pair of lobe-receiving holes being diametrically opposed to each other along the cranking head;
the spool being rotatably mounted to the first leg, adjacent to the second leg; and
the cranking head being axially connected to the spool through the first leg.

5. The apparatus for attaching power tools used in winding winch straps as claimed in claim 4 comprising:
a spool retaining washer;
the spool retaining washer being positioned adjacent the first leg, opposite the cranking head; and
the spool traversing through the spool retaining washer.

6. The apparatus for attaching power tools used in winding winch straps as claimed in claim 4 comprising:
the lobe of the first engagement plate and the lobe of the second engagement plate being positioned within the pair of lobe receiving holes; and
the lug of the first engagement plate and the lug of the second engagement plate being pressed against the cranking head.

7. An apparatus for attaching power tools used in winding winch straps comprising:
a clevis;
a first engagement plate;
a second engagement plate;
the clevis comprising a structural body, a first protrusion, a second protrusion, a tool-receiving slot, a first pin-receiving hole and a second pin-receiving hole;
the first engagement plate and the second engagement plate each comprising an oblong body, a lobe, a lug, and a plate pinhole;
the first engagement plate being positioned parallel and adjacent the second engagement plate;

the lobe and the plate pinhole being positioned opposite to each other along the oblong body;
the lug being positioned in between the lobe and the plate pinhole;
the lobe and the lug of the first engagement plate being oriented opposite the lobe and the lug of the second engagement plate;
the first engagement plate and the second engagement plate being positioned in between the first protrusion and the second protrusion;
the first engagement plate and the second engagement plate being rotatably connected to the clevis;
the tool-receiving slot being integrated into the structural body, opposite the first protrusion and the second protrusion;
the first protrusion and the second protrusion being positioned offset and parallel to each other;
the first protrusion and the second protrusion being extended from the structural body;
the first pin-receiving hole perpendicularly traversing through the first protrusion;
the second pin-receiving hole perpendicularly traversing through the second protrusion;
a single plate retaining pin;
the first engagement plate being positioned adjacent the first protrusion;
the first pin-receiving hole being concentric with the plate pinhole of the first engagement plate;
the plate pinhole of the first engagement plate being concentric with the plate pinhole of the second engagement plate;
the second engagement plate being positioned adjacent the second protrusion;
the plate pinhole of the second engagement plate being concentric with the second pin-receiving hole; and
the single plate retaining pin traversing through the first pin-receiving hole, the plate pinhole of the first engagement plate, the plate pinhole of the second engagement plate, and the second pin-receiving hole.

8. The apparatus for attaching power tools used in winding winch straps as claimed in claim 7 comprising:
the plate pinhole traversing through the oblong body;
the lobe and the lug extending from the oblong body; and
the lobe and the lug being positioned offset from each other along the oblong body.

9. The apparatus for attaching power tools used in winding winch straps as claimed in claim 7 comprising:
the tool-receiving slot comprising an inner lateral surface and an at least one receiving slot; and
the at least one receiving slot perpendicularly traversing into the inner lateral surface.

10. The apparatus for attaching power tools used in winding winch straps as claimed in claim 7 comprising:
a cranking head;
a spool;
an L-shaped base;
the cranking head comprising a cavity and at least one pair of lobe-receiving holes;
the L-shaped base comprising a first leg and a second leg;
the pair of lobe-receiving holes laterally traversing into the cranking head;
the cavity traversing into the cranking head;
the cavity being positioned perpendicular to the pair of lobe-receiving holes;
the pair of lobe-receiving holes being diametrically opposed to each other along the cranking head;

the spool being rotatably mounted to the first leg, adjacent to the second leg; and the cranking head being axially connected to the spool through the first leg.

11. The apparatus for attaching power tools used in winding winch straps as claimed in claim 10 comprising:

a spool retaining washer;

the spool retaining washer being positioned adjacent the first leg, opposite the cranking head; and the spool traversing through the spool retaining washer.

12. The apparatus for attaching power tools used in winding winch straps as claimed in claim 10 comprising:

the lobe of the first engagement plate and the lobe of the second engagement plate being positioned within the pair of lobe receiving holes; and the lug of the first engagement plate and the lug of the second engagement plate being pressed against the cranking head.

13. An apparatus for attaching power tools used in winding winch straps comprising:

a clevis;

a first engagement plate;

a second engagement plate;

a single plate retaining pin;

the clevis comprising a structural body, a first protrusion, a second protrusion, a tool-receiving slot, a first pin-receiving hole and a second pin-receiving hole;

the first engagement plate and the second engagement plate each comprising an oblong body, a lobe, a lug, and a plate pinhole;

the first engagement plate being positioned parallel and adjacent the second engagement plate;

the lobe and the plate pinhole being positioned opposite to each other along the oblong body;

the lug being positioned in between the lobe and the plate pinhole;

the lobe and the lug of the first engagement plate being oriented opposite the lobe and the lug of the second engagement plate;

the first engagement plate and the second engagement plate being positioned in between the first protrusion and the second protrusion;

the first engagement plate and the second engagement plate being rotatably connected to the clevis;

the tool-receiving slot being integrated into the structural body, opposite the first protrusion and the second protrusion;

the first protrusion and the second protrusion being positioned offset and parallel to each other;

the first protrusion and the second protrusion being extended from the structural body;

the first pin-receiving hole perpendicularly traversing through the first protrusion;

the second pin-receiving hole perpendicularly traversing through the second protrusion;

the first engagement plate being positioned adjacent the first protrusion;

the first pin-receiving hole being concentric with the plate pinhole of the first engagement plate;

the plate pinhole of the first engagement plate being concentric with the plate pinhole of the second engagement plate;

the second engagement plate being positioned adjacent the second protrusion;

the plate pinhole of the second engagement plate being concentric with the second pin-receiving hole; and the single plate retaining pin traversing through the first pin-receiving hole, the plate pinhole of the first engagement plate, the plate pinhole of the second engagement plate, and the second pin-receiving hole.

14. The apparatus for attaching power tools used in winding winch straps as claimed in claim 13 comprising:

the plate pinhole traversing through the oblong body;

the lobe and the lug extending from the oblong body; and the lobe and the lug being positioned offset from each other along the oblong body.

15. The apparatus for attaching power tools used in winding winch straps as claimed in claim 13 comprising:

the tool-receiving slot comprising an inner lateral surface and an at least one receiving slot; and the at least one receiving slot perpendicularly traversing into the inner lateral surface.

16. The apparatus for attaching power tools used in winding winch straps as claimed in claim 13 comprising:

a cranking head;

a spool;

an L-shaped base;

a spool retaining washer;

the cranking head comprising a cavity and at least one pair of lobe-receiving holes;

the L-shaped base comprising a first leg and a second leg;

the pair of lobe-receiving holes laterally traversing into the cranking head;

the cavity traversing into the cranking head;

the cavity being positioned perpendicular to the pair of lobe-receiving holes;

the pair of lobe-receiving holes being diametrically opposed to each other along the cranking head;

the spool being rotatably mounted to the first leg, adjacent to the second leg;

the cranking head being axially connected to the spool through the first leg;

the spool retaining washer being positioned adjacent the first leg, opposite the cranking head; and the spool traversing through the spool retaining washer.

17. The apparatus for attaching power tools used in winding winch straps as claimed in claim 16 comprising:

the lobe of the first engagement plate and the lobe of the second engagement plate being positioned within the pair of lobe receiving holes; and the lug of the first engagement plate and the lug of the second engagement plate being pressed against the cranking head.

\* \* \* \* \*